United States Patent [19]

Nozaki et al.

[11] Patent Number: 5,095,326
[45] Date of Patent: Mar. 10, 1992

[54] KEPLER-TYPE ERECT IMAGE VIEWFINDER AND ERECTING PRISM

[75] Inventors: Katsuhiko Nozaki; Tetsuya Abe, both of Tokyo, Japan

[73] Assignee: Asahi Kogaku Kogyo K.K., Tokyo, Japan

[21] Appl. No.: 648,942

[22] Filed: Feb. 1, 1991

Related U.S. Application Data

[63] Continuation-in-part of Ser. No. 426,655, Oct. 26, 1989, Pat. No. 4,992,809.

[30] Foreign Application Priority Data

Feb. 14, 1990 [JP] Japan .................................. 2-33001

[51] Int. Cl.$^5$ .................. G03B 13/10; G03B 13/08; G02B 5/04; G02B 15/00
[52] U.S. Cl. .................. 354/222; 354/225; 359/366; 359/831; 359/496; 359/669; 359/678
[58] Field of Search .................. 354/199, 155, 222, 224, 354/225, 201, 223; 350/505, 520, 521, 394, 402, 421, 424, 286, 287

[56] References Cited

U.S. PATENT DOCUMENTS

| | | | |
|---|---|---|---|
| 3,807,842 | 4/1974 | Baker | 350/286 X |
| 4,941,012 | 7/1990 | Inabata | 354/155 X |
| 4,945,372 | 7/1990 | Higuchi et al. | 354/222 X |
| 4,969,723 | 11/1990 | Kato et al. | 354/225 X |
| 4,992,809 | 2/1991 | Nozaki et al. | 354/222 X |
| 5,034,764 | 7/1991 | Inabata | 354/223 |

*Primary Examiner*—Russell E. Adams
*Assistant Examiner*—Jae N. Noh
*Attorney, Agent, or Firm*—Sughrue, Mion, Zinn, Macpeak & Seas

[57] ABSTRACT

A Kepler-type erect image viewfinder includes a first prism having an emergent surface being formed of a spherical or an aspherical surface and having a positive power. A second prism has an incident surface being formed of a spherical or aspherical surface and also having a positive power. The emergent surface of the first prism is spaced apart from the incident surface of the second prism, with an image-forming plane being positioned closer to the incident surface of the second prism than the emergent surface of the first prism. This arrangement enhances image magnification and compensates for field curvature, while simultaneously allowing for the viewfinder to have a reduced overall length.

12 Claims, 1 Drawing Sheet

KEPLER-TYPE ERECT IMAGE VIEWFINDER AND ERECTING PRISM

This application is a Continuation-In-Part of U.S. application Ser. No. 07/426,655, filed Oct. 26, 1989, now U.S. Pat. No. 4,992,809 which is incorporated herein by reference.

The present invention relates to a Kepler-type finder, and more particularly to a Kepler-type erect image viewfinder using a split porro-prism.

BACKGROUND OF THE INVENTION

With Kepler-type erect image viewfinders using a porro-prism, it is known to enhance image magnification by splitting the porro-prism into two prisms and providing the image-forming plane of the objective lens between the two prisms. With this arrangement, an eyepiece having a short focal length can be used to view the image on the image-forming plane, whereby the image magnification can be enhanced. However, the viewfinders using this split porro-prism arrangement have a problem in that compensating for field curvature is difficult. A field flattener used to compensate for field curvature works effectively if the flattener is positioned near the image-forming plane. However, this positioning of the flattener is impossible if the image-forming plane is provided between the first and second prisms.

To solve this problem, an improved Kepler-type viewfinder using a split porro-prism has been proposed, in which the incident surface of the first prism has optical attributes so as to serve as a field flattener (as described in Unexamined Published Japanese Utility Model Application No. 226616/1988). However, this viewfinder still has problems of how to further enhance the image magnification and how to shorten the overall length of the finder (e.g., in the longitudinal direction).

According to the analysis conducted by the present inventors, there are several reasons for these difficulties. First, in the system described in Unexamined Published Japanese Utility Model Application No. 226616/1988, the emergent surface of the first prism and the incident surface of the second prism are both flat. Hence, the two prisms cannot be spaced apart practically. If the prisms were to be spaced apart, the size of the second prism would have to be increased sufficiently to admit all of the divergent light rays from the first prism, and thus achieving an adequate increase in the image magnification would be difficult even if the focal length of the eyepiece was increased. Another reason for the above-described difficulties is that the optical path length cannot be increased in a lateral direction, and thus shortening the longitudinal length of the viewfinder is difficult.

In view of the above-described problems of the conventional systems, an object of the present invention is to provide a Kepler-type erect image viewfinder which enhances image magnification and satisfactorily compensates for field curvature, and which also has an overall length smaller than that of the conventional systems.

SUMMARY OF THE INVENTION

Based on the results of analyses of the problems associated with the viewfinder described in Unexamined Published Japanese Utility Model Application No. 226616/1988, the present inventors designed the first prism in the porro-prism of the viewfinder according to the present invention to work as a condenser lens by providing its emergent surface with a positive power. This arrangement allows the first and second prisms to be spaced apart. With the first and second prisms spaced apart, the optical path length can be sufficiently increased in the lateral direction to shorten the overall longitudinal length of the viewfinder. Further, the image-forming plane is positioned closer to the incident surface of the second prism, so that the relative focal length of the objective lens is increased whereas that of the eyepiece is shortened to further enhance the image magnification. Providing the emergent surface of the first prism with a positive power has the additional advantage of producing the same result as that attained by positioning a field flattener near the image-forming plane. Hence, an increased compensation for the field curvature results from this arrangement.

According to the present invention, the incident surface of the second prism is also provided with a positive power so that it works as a condenser lens. This feature, combined with the positive power of the emergent surface of the first prism and the provision of the image-forming plane in a position closer to the incident surface of the second prism than the emergent surface of the first prism, allows the first and second prisms to be spaced apart without unduly increasing the size of the second prism. Hence, the second prism is made compact and the focal length of the eyepiece can be sufficiently shortened to ensure an enhanced image magnification.

The viewfinder of the present invention is a Kepler-type erect image viewfinder in which the image formed by an objective optical system is viewed as an erect real image through a split porro-prism consisting of first and second prisms and an eyepiece optical system. The first prism has an incident surface, a reflecting surface 1—1 and an emergent surface. The second prism has an incident surface, reflecting surfaces 2—1 and 2—2 that are perpendicular to each other, a reflecting surface 2—3, and an emergent surface. The image from the objective optical system is formed between the emergent surface of the first prism and the incident surface of the second prism. The improvement includes the emergent surface of the first prism being formed of a spherical or aspherical surface having a positive power, and the incident surface of the second prism being formed of a spherical or aspherical surface also having a positive power.

To provide a further enhanced image magnification, the first and second prisms may be positioned so that the emergent surface of the first prism is spaced from the incident surface of the second prism, with the image-forming plane being positioned closer to the incident surface of the second prism than the emergent surface of the first prism.

BRIEF DESCRIPTION OF THE DRAWINGS

The above-mentioned and other objects of the present invention as well as the novel features thereof will be apparent from the detailed description herein when taken in conjunction with the drawings attached hereto in which.

DETAILED DESCRIPTION OF THE PREFERRED EMBODIMENT

Figure 1:
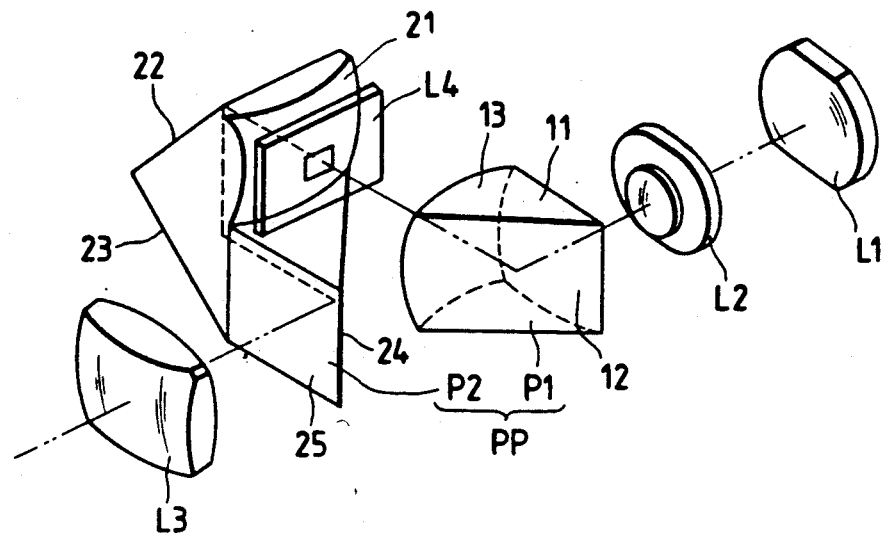
FIG. 1 is a perspective view of a Kepler-type erect image viewfinder according to an embodiment of the present invention.

An example of the viewfinder of the present invention is described hereinafter in detail with reference to FIGS. 1 and 2. As shown, the viewfinder comprises, in order from the object side, a first lens L1 having a negative power, a second lens L2 having a positive power, a split porro-prism PP consisting of a first prism P1 and a second prism P2, and an eyepiece L3.

The first prism P1 has an incident surface 11, reflecting surface (1—1) 12 and an emergent surface 13. The second prism P2 has an incident surface 21, a reflecting surface (2—1) 22 and a reflecting surface (2—2) 23 that are perpendicular to each other, a reflecting surface (2—3) 24, and an emergent surface 25. A glass plate L4 delineating a field view as an image-forming plane is positioned between the first prism P1 and the second prism P2. Glass plate L4 is positioned closer to the incident surface 21 of the second prism P2 than the emergent surface of prism P1.

The first characteristic feature of the present invention is that the emergent surface 13 of the first prism P1 and the incident surface 21 of the second prism P2 are both formed of a spherical or aspherical surface having a positive power. According to the second characteristic feature of the invention, the positive power of the surfaces 13 and 21 allows the first prism P1 to be spaced apart from the second prism P2, and the field view delineating glass plate L4 is positioned between the two prisms so that it is nearer to the incident surface 21 than to the emergent surface 13.

Numerous advantages accrue as a result of these features of the inventive arrangement. First of all, if the emergent surface 13 and the incident surface 21 were both flat as in the conventional systems and if the second prism P2 was spaced apart from the first prism P1, the divergent light rays emerging from the emergent surface 13 would not be admitted into the second prism P2 unless the size of the incident surface 21 were to be increased. Thus, as a practical matter, it would be impossible to space the second prism P2 apart from the first prism P1 with the conventional arrangment. On the other hand, if the emergent surface 13 is provided with a positive power as in the present invention, the emergent surface 13 operates as a condenser lens so that the divergent rays emerging from the emergent surface 13 can be effectively admitted into the incident surface 21 of the second prism P2, even if the second prism P2 is spaced apart from the first prism P1.

Furthermore, the positive power of the incident surface 21 of the second prism P2 also helps reduce the size of the second prism P2. As a result, the first prism P1 and the second prism P2 can be spaced apart. Spacing the first and second prisms apart increases the optical path length of the viewfinder in the lateral direction and, if the same (i.e., equal) optical path length is necessary, the overall length of the viewfinder in its longitudinal direction can be shortened.

Furthermore, providing a positive power for the emergent surface 13 of the first prism P1 results in the same advantage attained by a field flattener (used in the conventional systems) that would be is positioned near the field view delineating glass plate L4. This feature of providing emergent surface 13 with a positive power contributes to more effectively compensating for the field curvature.

Further, according to the present invention, if the field view delineating glass plate L4 is positioned between the spaced first and second prisms P1 and P2 in a location closer to the prism P2 than prism P1, the focal length of the eyepiece optical system can be shortened, whereas that of the objective lens system can be increased. This is readily understood in view of the image being formed on the field view delineating glass L4 by the objective lens system (composed of the first lens L1, the second lens L2, and the first prism P1) is viewed through the eyepiece optical system (composed of the second prism P2 and the eyepiece L3). Hence, the image magnification defined by the ratio of the focal length of the objective lens system to that of the eyepiece optical system can be enhanced. The size reduction of the second prism P2 resulting from its incident surface 21 having a positive power also shortens the focal length of the eyepiece optical system, and hence enhances the image magnification.

Figure 2:
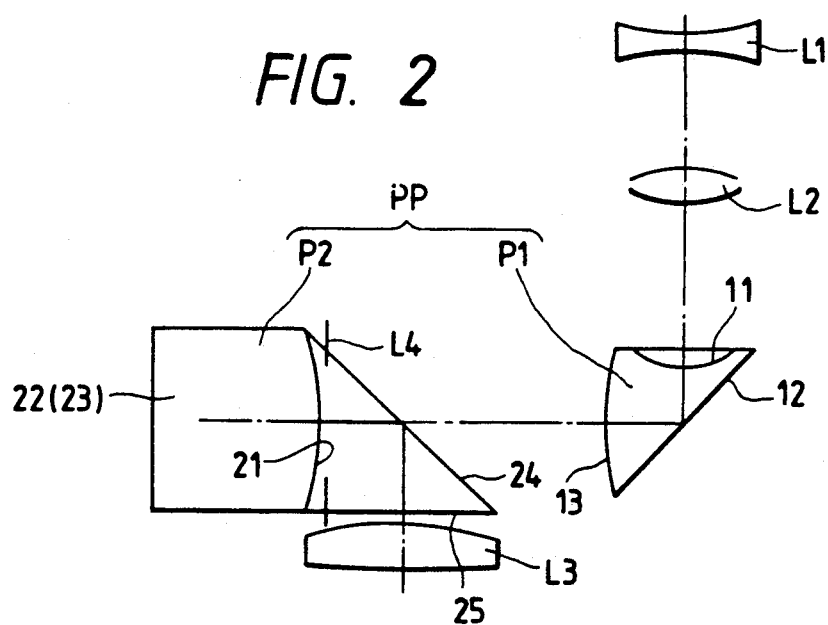
FIG. 2 is a plan view of the Kepler-type erect image viewfinder shown in FIG. 1.

In the embodiment shown in FIGS. 1 and 2, the incident surface 11 of the first prism P1 is formed of a spherical or aspherical surface having a negative power so that the first prism P1 operates as a meniscus lens when taken as a whole. Accordingly, this meniscus lens can be located in an aplanatic position with respect to the objective optical system composed of the first and second lenses L1 and L2, and any field curvature can be effectively compensated for without any aberrations resulting such as spherical aberration or coma.

Figure 3:
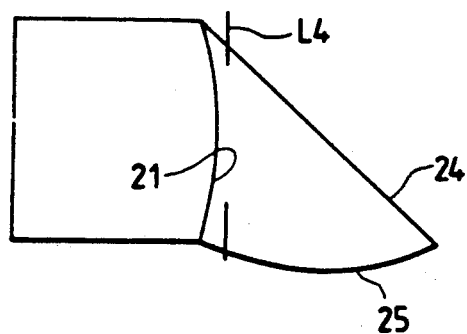
FIGS. 3 and 4 show examples of the shape of an emergent surface of a prism.
Figure 4:
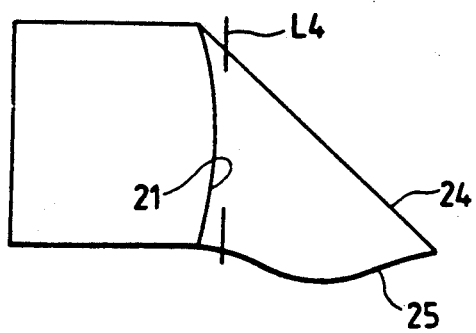

In the embodiment shown in FIGS. 1 and 2, the emergent surface 25 of the second prism P2 is a plane surface. However, this is not limiting and the surface 25 may be formed of a suitable spherical or aspherical surface as shown in FIGS. 3 and 4. This helps reduce the size of the eyepiece lens L3 by reducing the optical burden on it, or alternatively helps compensates for the aberrations that may be caused by lens L3.

As described on the foregoing pages, the Kepler-type erect image viewfinder of the present invention which uses a split porro-prism has the emergent surface of the first prism in the porro-prism and the incident surface of the second prism both being formed of a spherical or aspherical surface having a positive power. This configuration not only achieves satisfactory compensation for field curvature, but also shortens the overall length of the viewfinder in its longitudinal direction. As a further advantage, if the plane in which the image formed by the objective optical system is focused is positioned between the spaced first and second prisms in a location closer to the second prism, increased image magnification results.

The present invention is not confined to the embodiment described above, but may be embodied or practiced in other various ways without departing from the spirit or essential character thereof. Thus, the scope of the invention should be considered as limited only by the appended claims.

We claim:

1. In a Kepler-type erect image viewfinder in which an image formed by an objective optical system is viewed as an erect real image through a split porro-prism including a first and a second prism and an eyepiece optical system, said first prism having an incident surface, a reflecting surface 1—1, and an emergent surface, said second prism having an incident surface, reflecting surfaces 2—1 and 2—2 that are perpendicular to each other, a reflecting surface 2—3, and an emergent surface, the image from said objective optical system being formed between said emergent surface of said first prism and said incident surface of said second prism, the improvement comprising:

said emergent surface of said first prism being formed of one of a spherical and a aspherical surface having a positive power, and said incident surface of said second prism being formed of one of a spherical surface and an aspherical surface having a positive power.

2. A Kepler-type erect image viewfinder according to claim 1, wherein said first and second prisms are positioned so that said first prism is spaced from said second prism, and wherein an image-forming plane is positioned closer to said second prism than said first prism.

3. A Kepler-type erect image viewfinder according to claim 2, wherein said emergent surface of said first prism is spaced from said incident surface of said second prism.

4. A Kepler-type erect image viewfinder according to claim 2, wherein said image-forming plane is positioned closer to said incident surface of said second prism than said emergent surface of said first prism.

5. A Kepler-type erect image viewfinder according to claim 3, wherein said image-forming plane is positioned closer to said incident surface of said second prism than said emergent surface of said first prism.

6. A Kepler-type erect image viewfinder according to claim 1, wherein said incident surface of said first prism has a negative power so that said first prism operates as a meniscus lens.

7. A Kepler-type erect image viewfinder according to claim 1, wherein said emergent surface of said second prism is a plane surface.

8. A Kepler-type erect image viewfinder according to claim 1, wherein said emergent surface of said second prism is one of a spherical surface and an aspherical surface.

9. In an erecting prism which comprises a first prism having an incident surface, a reflecting surface 1—1, and an emergent surface, and a second prism having an incident surface, reflecting surfaces 2—1 and 2—2 that are perpendicular to each other, a reflecting surface 2—3, and an emergent surface, the improvement comprising:

said emergent surface of said first prism being formed of one of a spherical surface and an aspherical surface having a positive power, and said incident surface of said second prism being formed of one of a spherical surface and an aspherical surface having a positive power.

10. An erecting prism according to claim 9, wherein said incident surface of said first prism has a negative power.

11. An erecting prism according to claim 9, wherein said emergent surface of said second prism is a plane surface.

12. An erecting prism according to claim 9, wherein said emergent surface of said second prism is one of a spherical surface and a aspherical surface.

* * * * *

UNITED STATES PATENT AND TRADEMARK OFFICE
CERTIFICATE OF CORRECTION

PATENT NO. : 5,095,326

DATED : March 10, 1992

INVENTOR(S) : Nozaki et al

It is certified that error appears in the above-identified patent and that said Letters Patent is hereby corrected as shown below:

On the title page Item [30]
Foreign Application Priority Data, please delete and insert therefor:

```
--October 28, 1988 [JP] Japan - 63-140823
  December 27, 1988 [JP] Japan - 63-220466
  December 27, 1988 [JP] Japan - 63-330467
  February 14, 1990 [JP] Japan - 2-33001--
```

Signed and Sealed this

Fifth Day of October, 1993

BRUCE LEHMAN

*Attest:*

*Attesting Officer*    Commissioner of Patents and Trademarks